United States Patent
Bisschops et al.

(10) Patent No.: US 6,180,394 B1
(45) Date of Patent: Jan. 30, 2001

(54) METHOD OF CARRYING OUT A TREATMENT IN THE PRESENCE OF A CENTRIFUGAL FORCE AND AN APPARATUS THEREFOR

(75) Inventors: Marc A. T. Bisschops, Breda; Lucas A. M. van der Wielen, Bleiswijk; Karel C A M Luyben, Delft, all of (NL)

(73) Assignee: Bird Engineering B.V., Schiedam (NL)

( * ) Notice: Under 35 U.S.C. 154(b), the term of this patent shall be extended for 0 days.

(21) Appl. No.: 09/142,602

(22) PCT Filed: Mar. 11, 1997

(86) PCT No.: PCT/NL97/00121

§ 371 Date: Jan. 15, 1999

§ 102(e) Date: Jan. 15, 1999

(87) PCT Pub. No.: WO97/33687

PCT Pub. Date: Sep. 18, 1997

(30) Foreign Application Priority Data

Mar. 11, 1996 (NL) .................................................... 1002569

(51) Int. Cl.$^7$ ........................................................ C07C 7/00
(52) U.S. Cl. ..................... 435/280; 435/280; 435/283.1; 435/289.1; 435/293.2
(58) Field of Search ............................... 435/280, 283.1, 435/289.1, 293.2, 41

(56) References Cited

U.S. PATENT DOCUMENTS

| | | |
|---|---|---|
| 3,825,175 | 7/1974 | Sartory . |
| 4,077,886 | 3/1978 | Fukuda et al. . |
| 4,225,079 | 9/1980 | Yoshinaga et al. . |
| 4,294,800 | 10/1981 | Tavlarides et al. . |
| 4,798,579 | 1/1989 | Penhasi . |

FOREIGN PATENT DOCUMENTS

| | | |
|---|---|---|
| 3700122 A1 | 7/1988 | (DE) . |
| 528249 | 11/1921 | (FR) . |
| 62-100279 | 9/1987 | (JP) . |

OTHER PUBLICATIONS

Barson, N., et al., "Characteristics of a Podbielniak Centrifugal Extractor," *Chemical Engineering Progress*, vol. 49, No. 5 (May 1953) pp. 243–252.

Ma,. Ying, et al., "Resolution of Gram Quantities of Racemates by High–speed counter–Current Chromatography," *J. of Chromatography*, vol. 704, No. 1 (Jun. 2, 1995) pp. 75–81.

Primary Examiner—David A. Redding
(74) Attorney, Agent, or Firm—Jeffrey D. Myers

(57) ABSTRACT

The invention relates to a method and an apparatus for carrying out a treatment in the presence of centrifugal force. The treatment may be a physical or a chemical treatment. For this purpose the first and second phase are brought into contact with each other. The second phase comprises a phase soluble in the first phase and a third phase dispersed in the soluble phase. According to the invention at least one liquid phase is supplied continuously to a chamber for treatment (2) with a course of treatment while the third phase, which is a non-aggregating phase, is dispersed finely over the breadth of the course of treatment by the first phase.

16 Claims, 1 Drawing Sheet

METHOD OF CARRYING OUT A TREATMENT IN THE PRESENCE OF A CENTRIFUGAL FORCE AND AN APPARATUS THEREFOR

The present invention relates to a method of carrying out in a chamber for treatment a treatment in two, non-gaseous phases, wherein the phases have a different density, at least one liquid first phase is continuously supplied to the chamber for treatment, the phases being in contact with each other in a course of treatment in the chamber for treatment and that through the effect of a centrifugal force they move in relation to each other.

Such a method is known in the field. Using a Podbielniak centrifuge a liquid, dense phase is made to counterflow with a liquid, less dense phase. The effect of the centrifugal force causes the dense liquid to shift radially outward, while the less dense liquid phase moves toward the axis of rotation. To enlarge the contact surface between the two liquid phases use is made of elements, which are concentric in relation to the axis of rotation, which elements are provided with holes.

It is the object of the present invention to improve the known method and in addition to widen the range of applications.

To this end the method according to the invention is characterized in that the second phase comprises a phase soluble in the first phase and a third phase dispersed in the soluble phase, which third phase is during treatment substantially non-aggregating, and which third phase, substantially due to the supply of the first phase, disperses finely over the breadth of the course of treatment, said treatment involving the transfer of a substance from the first phase to a third phase particle and/or from the third phase particle to the first phase.

By using a non-aggregating third phase, the time of contact required to carry out the treatment is considerably shortened. This means that a smaller apparatus will suffice to carry out the method.

In the framework of the present invention the term treatment means the carrying out of a chemical or physical process in which a substance is transferred from the first to a third phase particle and/or from the third phase particle to the first phase. Chemical processes, for example are the reaction of a reactant with at least one other reactant, including a catalyst such as an enzyme. Physical processes, for example, are adsorption, extraction as well dissolution and growth.

The present invention is therefore particularly suitable for the removal of heavy metal ions and organic pollutants from waste water or process liquids, as well as for pharmaceutical applications such as in the isolation of proteins or antibiotics from fermentation batter, or for carrying out enzymatic conversions.

The invention also relates to an apparatus for carrying out a treatment in two non-gaseous phases, which apparatus comprises a chamber for treatment to be rotatable around a drivable axis, wherein near the axis the chamber for treatment is provided with an inlet for a high density phase and at a distance from the axis with an outlet for the high density phase, as well as with an inlet for a low density phase between the outlet for the high density phase and the inlet for the high density phase, and an outlet for the low density phase between the axis and the inlet for the high density phase, and wherein the course between the inlet for the high density phase and the inlet for the low density phase is a course of treatment, wherein the course of treatment lacks means consisting of, in relation to the rotation axis, concentric parts to prevent aggregation of a phase to be supplied.

Such an apparatus is known from U.S. Pat. No. 4,225,079. In the known apparatus the second phase is dispersed in the first phase by introducing the second phase into the first phase via tubes with small holes.

It is the object of the present invention to provide an apparatus with a wider range of application.

To this end, the apparatus according to the invention is characterized in that the chamber for treatment is provided with means affecting the velocity of a first phase to be supplied in order to substantially contactless affect the velocity with which a suspended third phase supplied in a second phase, moves in the course of treatment in relation to the wall of the chamber for treatment, said means narrowing or widening the cross-section of the chamber for treatment 2 at the height of the course of treatment.

Such an apparatus is suitable for supplying a second phase comprising solid particles.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

Figure 1:
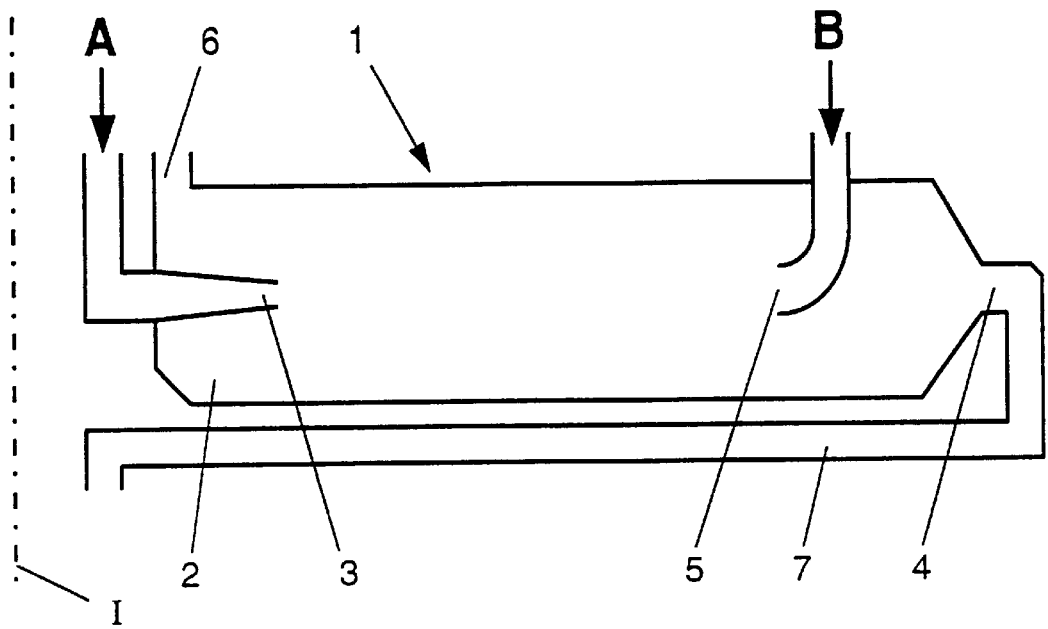
FIG. 1 is a schematic cross-section of a preferred embodiment of the apparatus of the invention.

The apparatus according to the invention comprises a housing 1 with a chamber for treatment 2, wherein the chamber for treatment 2 can be rotated around an axis I. Near, but at some distance from the axis I, an inlet 3 is provided for supplying a high density phase A and at a greater distance from the axis, an outlet 4 for the high density phase A. Between the outlet 4 and the inlet 3 an inlet 5 is provided for a low density phase B. Between the axis I and the inlet 3 an outlet 6 is provided for the low density phase B. A course of treatment is defined by the section of the chamber for treatment 2 between the inlet 3 and the inlet 5.

According to an advantageous embodiment (not shown), the chamber for treatment 2 is shaped like a ring in which the axis I coincides with the heart line of the ring. This provides a compact apparatus.

To carry out a treatment, a high density phase A is introduced into the course of treatment, that is a path of treatment via inlet 3. By means of a centrifugal force generated through the rotation of the housing 1 around the axis I, the phase A is subjected to an outwardly directed radial force. Phase B is supplied to the course of treatment via inlet 5.

According to the invention a first liquid phase is applied which may be either the high density phase A or the low density phase B. Further, a liquid second phase is supplied which comprises a continuous liquid phase soluble in (in the case of substantially identical solutions one may also speak of completely miscible with) the first phase in which a third phase is dispersed. The dispersed third phase may be a liquid or a solid phase. The density of the third phase should be either higher than the density of both the first phase and the phase soluble with the first phase, or lower than both the first phase and the phase soluble in the first phase.

The effect of the centrifugal force generated by rotation and the liquid first phase continuously supplied to the chamber for treatment 2, make the supplied phase A or B move in respect to the third phase.

In the method according to the invention several parameters play a role, in particular the density of the first and third phase and the hydrodynamic properties of the third phase (which depends, inter alia, on the particle size of the third phase). The viscosity of the first phase—and consequently the flow resistance that the third phase undergoes—can be influenced by varying the temperature, by adding viscosity-altering agents, etc. Apart from that, the speed of revolution and the dimensions of the chamber for treatment 2 are important. Thus the expert has a plurality of parameters at his disposal for the optimization of the treatment he wishes to carry out.

According to an advantageous embodiment the first and the second phase are continuously supplied to the chamber for treatment and the first and the third phase move in the opposite direction; in other words, the treatment is carried out in counterflow, which is favourable for many treatments.

According to a favourable embodiment the third phase is a solid phase dispersed in a liquid which is soluble in the first phase. This liquid is preferably the same as the one of the first phase.

According to another favourable embodiment the third phase is a liquid phase, emulsified in a liquid which is soluble in the first phase. In this case also the liquid is preferably the same as the one of the liquid first phase.

In order to maintain an emulsion or suspension which is at least in the course of treatment stable, that is to say substantially non-aggregating, techniques can be applied which are well-known in the field, such as using surfactants, etc. Due to the relative movement of the third phase and the first phase, there is a relatively quick dispersion of third phase over the breadth of the chamber for treatment in the course of treatment.

According to the invention the third phase is dispersed finely in the first phase. The size of the liquid or solid particles of the third phase is typically 0.2 mm to micron range and smaller. Liquid particles will tend to be smaller, 0.02 mm and smaller. This is much smaller than can be achieved with the apparatus described in U.S. Pat. No. 4,225,079. To the expert it is clear that the lower threshold of the particles is determined by the properties of the particles of the third phase and the first phase used, in particular by the difference in density between the third and first phase. A greater difference in density allows the use of smaller particles.

The method according to the invention does not only achieve a large contact surface between the first and third phase, but the diffusion distance is also shortened. This contributes very much to the efficiency of the treatments when using the method and apparatus according to the invention. In particular, the method according to the invention makes it possible to use much more compact apparatuses.

After passing through the course of treatment, the dense phase A reaches outlet 4. This may be an opening in the housing 1. In that case the apparatus will be surrounded by a wall to collect discharged material. The outlet 4 may also connect with a pipe 7 leading back to the axis I. In the case that the third phase is a dense phase, it must be taken into account that this dense third phase has to be transported against the centrifugal force. This is possible by choosing a suitable, that is to say a narrow diameter for the pipe, so that the flow rate in the pipe is high. Active transport is also possible by feeding extra liquid, for instance part of the treated or untreated first phase to pipe 7, realizing a sufficiently high flow rate in the pipe 7 to guarantee the transport to the axis I. The outlet 4 may be provided with a so-called vortex mouth-piece. This makes it possible to limit the loss of less dense phase via outlet 4.

The present invention makes numerous applications possible. The treatment may be a physical treatment, such as extraction or sorption treatment. The third phase may, for instance, consist of solid or liquid particles with the ability to catch heavy metals. Depending on the application, one might in this connection preferably consider particles provided with selective chelating groups, crown ethers or ion exchange groups. The particles may be carried in counter-flow by a liquid to be treated whereby, due to the counter-flow principle, heavy metal can be removed to a large extent. The liquid flow to be treated may, for instance, be a waste water flow or a product flow that is to be purified such as, for instance, a solution of a pharmaceutical compound.

According to an alternative embodiment the treatment comprises a chemical treatment such as an enzymatic treatment. The invention affords the possibility of applying in a continuous process enzymes—which, for instance, due to the process conditions employed—are little stable.

The treatment may advantageously be associated with the separation of particles of the third phase, for instance, separation of particles which as a result of the treatment have become loaded with a substance extracted from the first phase. At the end of the course of treatment near the axis I, an outlet may be provided for less dense particles and at the end of the course of treatment farthest from the axis I, an outlet may be provided for denser particles.

Because of the differences in density and hydrodynamic properties, separation can be realized by choosing a suitable speed of revolution and velocity of the liquid first phase. In the case that with respect to the properies there is a continuous medium, such as may be the case with solid particles obtained by grinding, one may, for instance, periodically increase or decrease the velocity of the liquid first phase in order to avoid particles of the third phase accumulating in the course of treatment.

On the other hand, the principle of accumulation may also be utilized if the chamber for treatment 2 is provided with means affecting the velocity of a first phase to be supplied in order to substantially contactlessly affect the velocity with which the dispersed third phase in the second phase moves in the course of treatment in relation to the wall of the chamber for treatment. By narrowing or widening the diameter of the chamber for treatment 2 at the height of the course of treatment, the velocity of the first phase can be altered locally. Thus the third phase's velocity of movement in the course can, depending on the location of the third phase in the course of treatment, be altered without there being direct contact between (the majority of) the third phase and the means. The velocity of the first phase may be influenced by means of having substantially the entire course of treatment narrow in a tapering fashion, as seen from the rotation axis. In this way the change that the rate of movement of the third phase undergoes in the course of treatment can be limited to a lesser or greater, even though the radial centrifugal force becomes stronger due to the greater distance from the rotation axis.

Figure 2:
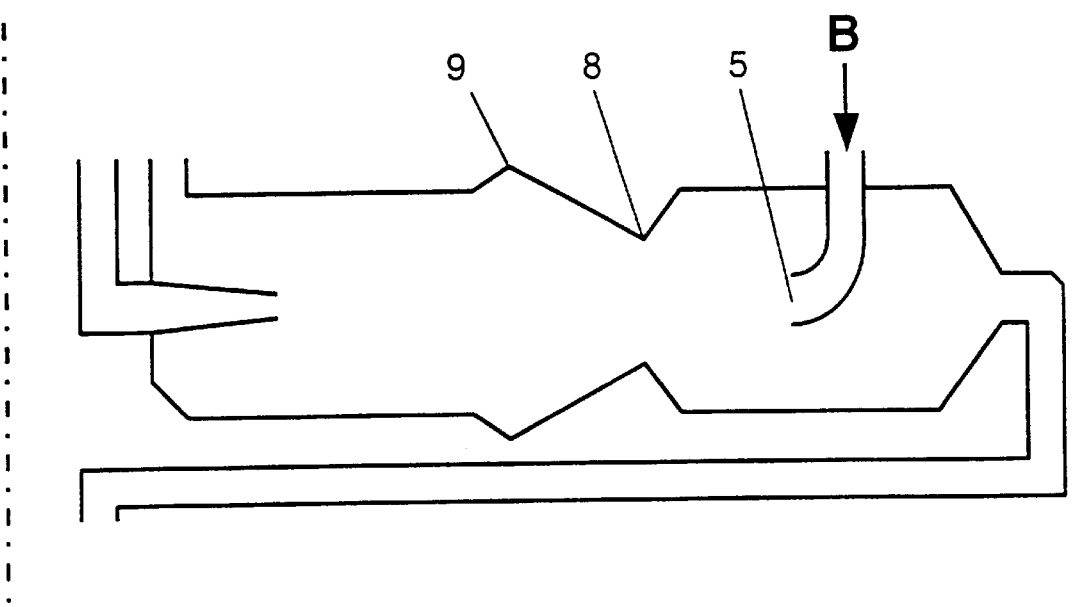
FIG. 2 is a schematic partial cross-section of an alternative embodiment of the apparatus of the invention.

To locally alter the velocity of the third phase in the course of treatment the means, according to a favourable embodiment, comprise a constriction 8 at a distance from the rotation axis I and, optionally, an expansion 9 of the chamber for treatment 2 at a shorter distance, as shown in FIG. 2. The constriction 8 locally ensures a higher flow rate of the first phase so that only particles of sufficient density and little hydrodynamic resistance are able to pass this barrier, while on the other hand at the expansion 9, the flow rate is so low that only particles having a high flow resistance are discharged. After sufficient enrichment has taken place in the course of treatment, the particles of the desired particle size distribution can be extracted by altering the velocity of the first phase or by altering the rotation speed.

The option of keeping particles of the third phase substantially stationary in the course of treatment, offers numerous interesting possibilities, as will be discussed below.

According to an interesting aspect of the present invention, a mixture of enantiomers to be treated is introduced into the chamber for treatment 2 near the middle of the course of treatment and at least at one end of the course of treatment a third phase, exhibiting a selectivity for a first enantiomer is introduced, which is carried to the other end of the course.

Use can be made of a first phase, exhibiting a selectivity for the second enantiomer or particles carried in the first phase exhibiting such a selectivity. For the third phase also, particles may be considered which are at present used for the chromatographic separation of enantiomers. In the method according to the invention only a limited amount of selective material is required, which is very economical. Moreover, in contrast with column chromatography techniques, the method can be carried out continuously. It is perhaps also possible to use an enantio-selective liquid as the first or second phase such as (a solution of) an alkyl ester of a lactic acid enantiomer.

If only one of the enantiomers is commercially interesting, it is worth the consideration of carrying out an enzymatic racemisation reaction with the aid of particles of the third phase which are kept substantially stationary in the course of treatment. That is to say, in that part of the course of treatment where the concentration of undesired enantiomer is high, particles with immobilized racemase are kept stationary. Particles of the third phase exhibiting selectivity for the desired enantiomer must have a density so high and/or a hydrodynamic resistance so low (or low density and/or high hydrodynamic resistance) that they are able to pass the barrier keeping the stationary particles in their place.

Another application of the method according to the invention is a treatment in which solid particles are enlarged by means of a growth process (or possibly reduced in size, for instance, by means of chemical or physical dissolution, which dissolution processes within the scope of the present invention lie within the definition of treatment) and are retained until they are able to leave the substantially stationary condition and are discharged. That is to say, during the growth process the particles will slowly move in the direction of the barrier until they are able to pass said barrier, after which they are quickly discharged. In this way it is possible to obtain particles of substantially uniform size.

To the expert it is clear that the method according to the invention offers numerous possibilities. It is possible to use as particles catalysts (which are active for a short time only), and immobilization of enzymes is not necessary if they are incorporated in micelles, which may be used as third phase.

Apart from eliminating heavy metals and organic solvents from liquids, it is worth considering refining liquids containing valuable products. Valuable substances may be proteins, amino acids, peptides, alkaloids, (semisynthetic) antibiotics, etc. In this process use is preferably made of a selective first and/or preferably third phase.

Of course, it is possible to regenerate particles from the third phase which have passed the course of treatment and which have taken up, for instance, heavy metals, in a (smaller) apparatus according to the invention.

The third phase may comprise a variety of particles, among which cells for carrying out a treatment, solid carriers on which cells, enzymes or catalysts are immobilized, etc.

It will be clear to the expert that the term "near the middle" must be interpreted broadly, as the precise place also depends on the form of the course of treatment, the treatment to be carried out, etc.

What is claimed is:

1. A method of carrying out in a chamber for treatment a treatment in two, non-gaseous phases, said treatment involving the transfer of a substance between the phases wherein the phases have a different density, at least one liquid first phase is continuously supplied to the chamber for treatment, the phases being in contact with each other in a course of treatment in the chamber for treatment and that through an effect of a centrifugal force they move in relation to each other, wherein the second phase comprises a phase soluble in the first phase and a third phase dispersed in the soluble phase, which third phase is during treatment substantially non-aggregating, and which third phase, substantially due to the supply of the first phase, disperses finely over a breadth of the course of treatment, said treatment involving a transfer of a substance selected from the group consisting of from the first phase to a third phase particle and from a third phase particle to the first phase.

2. A method according to claim 1, wherein the first and the second phase are supplied to the chamber for treatment continuously, and the treatment is carried out in counterflow.

3. A method according to claim 1, wherein the third phase is a solid phase, suspended in the phase which is soluble in the first phase.

4. A method according to claim 1, wherein the third phase is a liquid phase, emulsified in the phase which is soluble in the first phase.

5. A method according to claim 1, wherein the third phase in the course of treatment is kept in a substantially stationary condition.

6. A method according to claim 1, wherein the treatment comprises a chemical treatment.

7. A method according to claim 6, wherein the chemical treatment is an enzymatic treatment.

8. A method according to claim 1, wherein the treatment is a treatment separating enantiomers.

9. A method according to claim 8, wherein a mixture of enantiomers to be treated is introduced into the chamber for treatment near a middle of the course of treatment, that at least at one end of the course of treatment a third phase, exhibiting a selectivity for a first enantiomer, is introduced and is carried to another end of the course.

10. A method according to claim 8, wherein the third phase is a racemase-containing phase which is kept in a substantially stationary condition.

11. A method according to claim 5, wherein the third phase comprises solid particles which are enlarged by means of a growth process and which are retained until they are able to leave the substantially stationary condition and are discharged.

12. A method according to claim 5, wherein the third phase comprises solid particles which are reduced in size by means of a dissolution process and which are retained until they are able to leave the substantially stationary condition and are discharged.

13. An apparatus for carrying out a treatment in two non-gaseous phases, which apparatus comprises a chamber for treatment to be rotatable around a drivable axis, wherein near the axis the chamber for treatment is provided with an inlet for a high density phase and at a distance from the axis with an outlet for the high density phase, as well as with an inlet for a low density phase between the outlet for the high density phase and the inlet for the high density phase, and an outlet for the low density phase between the axis and the inlet for the high density phase, and comprising a course of treatment between the inlet for the high density phase and the inlet for the low density phase, wherein the course of treatment lacks means consisting of, in relation to the rotation axis, concentric parts to prevent aggregation of a phase to be supplied, wherein the chamber for treatment is provided with means affecting a velocity of a first phase to be supplied in order to substantially without contact affect a velocity with which a suspended third phase supplied in a second phase moves in the course of treatment in relation to a wall of a chamber for treatment, said means affecting a velocity narrowing or widening a cross-section of the chamber for treatment at a height of the course of treatment.

14. An apparatus according to claim 13, wherein the chamber for treatment is shaped like a ring and the axis of rotation coincides with a heart line of the ring.

15. An apparatus according to claim 13, wherein the means to influence the velocity of the first phase to be supplied are comprised by having substantially the entire course of treatment narrow in a tapering fashion, as seen from the rotation axis.

16. An apparatus according to claim 13, wherein in the course of treatment said means affecting a velocity comprises a constriction at a distance from the rotation axis and an expansion of the chamber for treatment at a shorter distance.

* * * * *